June 2, 1970     A. G. WORDSWORTH     3,515,399

TOOL SOCKET RETAINER

Filed Sept. 5, 1968

INVENTOR
ALBERT G. WORDSWORTH
BY
David W. Tillott
ATTORNEY

United States Patent Office 3,515,399
Patented June 2, 1970

3,515,399
TOOL SOCKET RETAINER

Albert G. Wordsworth, Sayre, Pa., assignor to Ingersoll-Rand Company, New York, N.Y., a corporation of New Jersey Filed Sept. 5, 1968, Ser. No. 757,661

Int. Cl. B25g *3/12*

U.S. Cl. 279—93 3 Claims

ABSTRACT OF THE DISCLOSURE

A retainer mechanism for a tool spindle including a forwardly inclined sliding lock pin adapted to be depressed rearwardly by a lock releasing member sliding in an axial bore intersecting the inclined lock pin bore. The lock releasing elements are assembled in the axial bore by being first inserted through the inclined lock pin bore.

BACKGROUND OF INVENTION

This invention relates to the general art of rotary tools and specifically to a retainer mechanism for holding an attachment such as a wrench socket on a driving spindle. This invention is an improvement over the U.S. Pat. No. 3,011,794 issued to J. S. Vaughn on Dec. 5, 1961.

The foregoing patent discloses a retainer mechanism including a sliding lock pin contained in an inclined bore and operated by a lock releasing member located in the axial end of the tool spindle and held in position by a snap ring. A disadvantage of this retainer is that the snap ring occasionally breaks or slips out of position causing the failure of the retainer and, sometimes, the loss of some of the parts of the retainer.

SUMMARY OF INVENTION

The principal object of this invention is to solve the foregoing problem and to eliminate the use of a snap ring in the retainer mechanism.

Other important objects are: to reduce the number of parts used in the retainer mechanism; and to simplify the operation of assembling the retainer mechanism.

In brief, this invention includes providing the axial bore in the tool spindle with an integral abutment so that the lock releasing member cannot be removed through the outer end of the axial bore, dimensioning and shaping the retainer elements so that the lock releasing member can be assembled in the axial bore by inserting it through the inclined lock pin bore prior to the insertion of the lock pin, and by providing the lock pin with a groove to enable the assembly of the lock releasing link into the axial bore behind the lock releasing member.

BRIEF DESCRIPTION OF DRAWING

The invention is explained in connection with the drawing wherein.

DESCRIPTION OF PREFERRED EMBODIMENT

Figure 1:
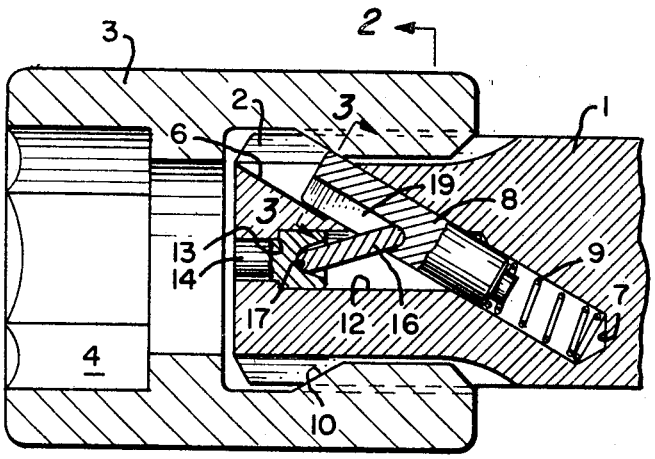
FIG. 1 is an axial section of a tool spindle carrying a wrench socket locked on the spindle by the retainer mechanism of this invention.
Figure 2:
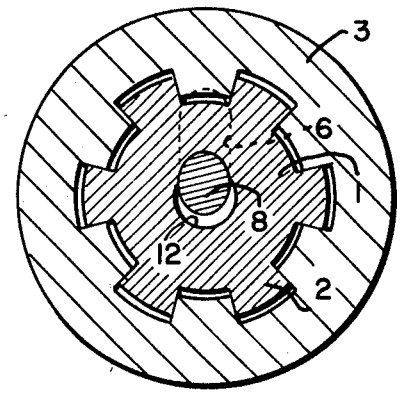
FIG. 2 is a section taken on line 2—2 of FIG. 1.
Figure 3:
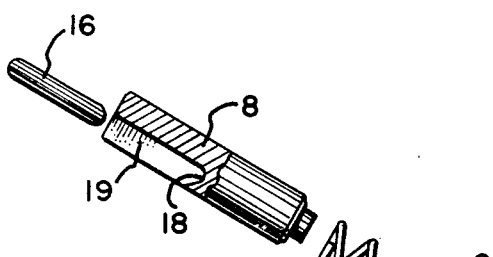
FIG. 3 is a fragmentary and enlarged section taken on line 3—3 of FIG. 1.
Figure 3:
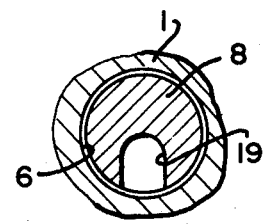

The apparatus shown in FIG. 1 includes the forward end of the spindle 1 of a rotary tool (not shown) which can be either a power tool or a hand wrench. Generally, the spindle carries a series of keying splines 2 for engagement with corresponding flutes on the wrench socket 3 to provide keyed engagement therebetween. The socket 3 is shown as containing a polygonal bore 4 in its forward end adapted to engage and rotate a fastener. In place of the splines 2, the socket 3 could be keyed on the spindle 1 by other suitable spindle cross-sections such as a square cross-section, which is common in the hand wrench art.

The spindle 1 is provided with an inclined bore 6 extending forwardly and outwardly and opening along a valley between a pair of splines 2. The inclined bore 6 extends inwardly through the axis of the spindle and for a substantial distance beyond the axis, terminating at an end 7 short of the surface of the spindle. A lock pin 8 is slidably mounted in the inclined bore with a spring 9 positioned between the lock pin 8 and the end 7 of the bore 6 to urge the lock pin 8 outwardly. The socket 3 carries an internal annular shoulder 10 adapted to engage the outer end of the lock pin 8 to retain the socket on the spindle 1. The lock pin 8 must be retracted within the inclined bore 6 for the release of the socket 3.

The spindle 1 further contains an axial bore 12 which intersects the inclined bore 6 and opens forwardly through the end of the spindle. This bore 12 is reduced in size near its open end to form a rearwardly facing shoulder 13. A lock release button or plug 14 is slidably mounted in the axial bore 12 and has a forward shoulder to abut the rear shoulder 13 to prevent the button 14 from being withdrawn through the open end of the axial bore 12.

Figure 4:
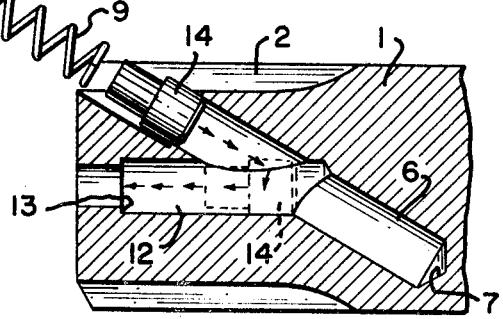
FIG. 4 is an exploded sectional view of the various parts comprising the retainer mechanism illustrating the sequence of assembling the retainer parts.

FIG. 4 shows how the button 14 is inserted into the axial bore 12. The button 14 is first inserted rear end first into the inclined bore 6 and moved through the bore 6 until reaching the axial bore 12 whereupon it is tilted forwardly into alignment with the axial bore 12 and moved forward to rest against the shoulder 13, as shown in FIG. 1.

After the lock release button 14 is assembled, the spring 9 and lock pin 8 are inserted into the inclined bore 6 as illustrated in the exploded view in FIG. 4.

The lock release button 14 is interconnected in the assembled position of the retainer mechanism by a lock release link 16 which engages a rearwardly facing depression or seat 17 formed in the rear end of the lock release button 14. The forward end of the link 16 abuts a cavity 18 provided in the lock pin 8. With this arrangement, the rearward depression of the lock release button 14 will act through the link 16 to retract the lock pin 8 rearwardly within the inclined bore 6, thereby releasing the socket 3.

Figure 5:
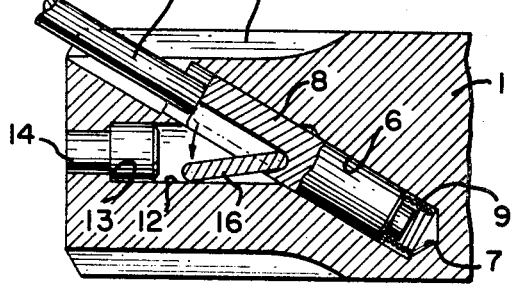
FIG. 5 is a section illustrating the retainer in an intermediate condition during assembly.

The lock pin 8 is provided with a longitudinal groove 19 extending from its outer end to the cavity 18 to receive the lock release link 16 enabling the assembly of the link 16. FIG. 5 illustrates the assembly of the link 16. After the lock pin 8 is in place within the inclined bore 6, the link 16 is dropped into the groove 19 and both the lock pin and link are depressed within the inclined bore 6 using a suitable tool or rod 20. After the lock pin 8 is depressed to the position shown in FIG. 5, the link 16 can swing forwardly into the axial bore 12. Thereafter, the lock pin 8 is released and the link 16 is automatically moved forwardly into its seat 17 in the rear end of the lock release button 14. When the link 16 is firmly seated on the button seat 17, it stops the lock pin 8 from continuing outwardly beyond the position shown in FIG. 1. At this time the retainer mechanism is fully assembled and ready for use. This retainer mechanism can be disassembled following a reversal of the steps used for assembly.

This invention is an improvement over the U.S. Pat. No. 3,011,794 by having the lock release button 14 mounted so that it cannot be removed through the forward open end of the axial bore 12. In addition, it is believed that this improvement can be assembled faster and easier due to the elimination of the need for mounting a snap ring. Finally, this improved mechanism is less expensive to manufacture due to the elimination of the snap ring.

While only a single embodiment of the invention is illustrated and described in detail, this invention is not limited simply to the described embodiment, but contemplates other embodiments and variations which utilize the concepts and teachings of this invention.

I claim:

1. A retainer for holding an attachment on a tool spindle, comprising:
   a first bore provided in said spindle extending forwardly and outwardly at an angle to the axis of said spindle;
   a locking pin slidably mounted in said first bore;
   resilient means urging said locking pin outwardly in said first bore;
   a second bore provided in said spindle to extend axially intersecting said first bore and opening forwardly from the forward end of the spindle;
   a lock releasing member slidably mounted in said second bore and adapted to abut an integral shoulder in said second bore to prevent its removal forwardly through the front end of said second bore, said lock releasing member being shaped to allow it to be assembled in said second bore by being inserted into said first bore;
   a link interconnecting said locking pin and said lock releasing member and preventing said locking pin from sliding out of said spindle, said link being effective to move said locking pin inwardly and rearwardly to release the attachment upon the depression rearwardly of the lock releasing member; and
   means allowing the link to be assembled in said second bore by being inserted through said first bore accompanied by the forcing of the locking pin rearwardly and inwardly.

2. The retainer of claim 1 wherein:
   said second bore contains an annular shoulder adapted to engage and stop the lock releasing member from being withdrawn forwardly through said second bore.

3. The retainer of claim 1 wherein:
   said means allowing said link to be assembled within said spindle is a longitudinal groove formed in said locking pin extending rearwardly from the outer end of the locking pin.

References Cited

UNITED STATES PATENTS

| 2,990,189 | 6/1961 | Beers. | |
| 3,011,794 | 12/1961 | Vaughn | 279—76 |

ROBERT C. RIORDON, Primary Examiner

D. D. EVENSON, Assistant Examiner